July 26, 1927. 1,637,042
L. P. HUTT
COMBINED AUTOMATIC AND MANUAL CIRCUIT CONTROLLER
Filed Dec. 13, 1926 3 Sheets-Sheet 1

Inventor:
Leonard P. Hutt,
by *His Attorney*

July 26, 1927.  
L. P. HUTT  
1,637,042  
COMBINED AUTOMATIC AND MANUAL CIRCUIT CONTROLLER  
Filed Dec. 13, 1926   3 Sheets-Sheet 3

Inventor:
Leonard P. Hutt,
by
His Attorney

Patented July 26, 1927.

1,637,042

UNITED STATES PATENT OFFICE.

LEONARD P. HUTT, OF SCHENECTADY, NEW YORK, ASSIGNOR TO GENERAL ELECTRIC COMPANY, A CORPORATION OF NEW YORK.

COMBINED AUTOMATIC AND MANUAL CIRCUIT CONTROLLER.

Application filed December 13, 1926. Serial No. 154,606.

This invention relates to circuit controlling devices and pertains especially to controllers for electrically operated apparatus such as electric refrigerators or the like where it is desired that the circuit of the device be controlled automatically by means responsive to predetermined conditions such as temperature as well as be protected automatically from excessive current flow, and in addition be under manual control for initiating and teminating operation of the device at will.

One of the principal objects of the present invention is to provide a controller of the above character capable of accomplishing all of the automatic and manual controlling functions through the agency of the same circuit controlling switch mechanism.

While my present invention is not necessarily limited thereto, it is as previously indicated, particularly advantageous in circuit controlling apparatus for electric refrigerators especially of the household type. In the usual form of household electric refrigerators, the refrigeration is accomplished by a compressor driven by an electric motor which is started and stopped through the agency of an automatic device operating in accordance with temperature conditions within the refrigerator. From the safety standpoint it is also necessary that the motor circuit be interrupted in case the motor should become stalled or overloaded so as to receive a continued current of sufficient value to burn out or damage the driving motor. Furthermore, some form of manually operated controller is required to place the refrigerator into and out of operation as desired.

As specifically applied to controllers for electric refrigerators, my invention enables the automatic temperature control of the electric refrigerator and the automatic overload protection of the device as well as the manual control thereof to be consolidated in a single switch mechanism for opening and closing the energizing circuit of the refrigerator. In this way the whole controlling apparatus may be made very compact which is of considerable advantage in household electric refrigerator control equipment. Also greater reliability may be obtained by concentrating all of the circuit controlling operations in a single switch mechanism of ample design and capacity to successfully make and break the circuit throughout a long period of service than where a plurality of separate and independently operable automatic and manual circuit controlling devices are employed.

The accompanying drawings illustrate my invention embodied in two types of control apparatus for accomplishing all of the above mentioned controlling functions for a domestic electric refrigerator by means of a common circuit controlling switch mechanism.

Figure 1:
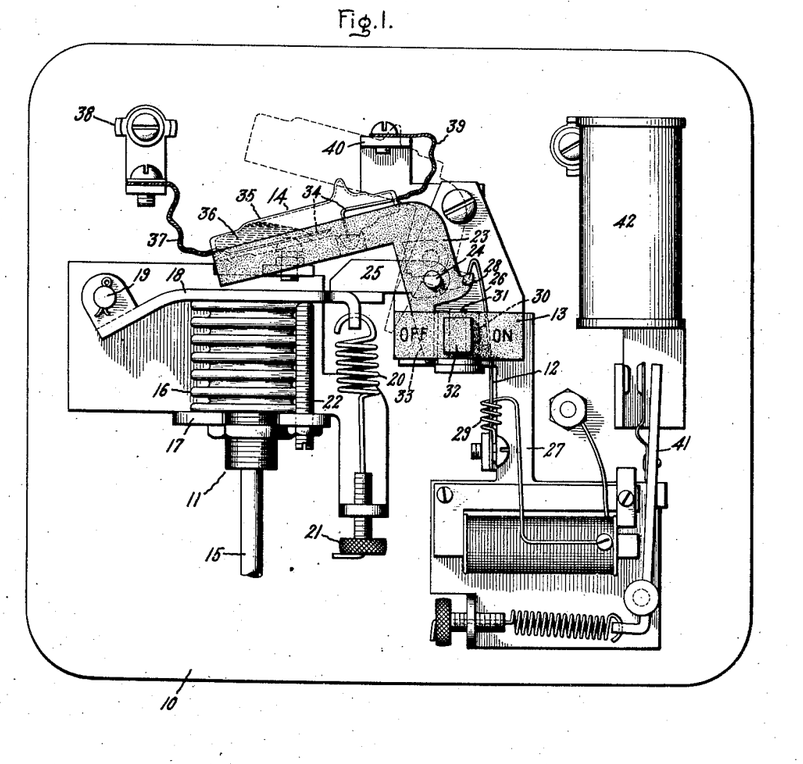
Fig. 1 is an assembly showing the general arrangement of the various parts of a mercury switch type of temperature, overload, and manual control mechanism embodying the invention.

As shown in Fig. 1 the mercury switch type of electric refrigerator controller, comprises a base 10 of suitable insulating material upon which are mounted the automatic temperature responsive actuating element 11, the automatic overload responsive actuating element 12, and the manual controlling element 13, each of which operates upon the same tilting mercury switch 14 to control the circuit of the driving motor of the refrigerator.

The temperature responsive element 11 is shown as of the well known sylphon type. In this device a suitable fluid such for example as sulphur dioxide is enclosed in an extension of the pipe 15 into the refrigerating compartment. The variations in pressure of the fluid due to temperature changes within the refrigerating compartment are transmitted to the sylphon bellows 16 and the deeply corrugated side walls of the bellows readily permit expansion and contraction thereof in accordance with the temperature of the refrigerator. The bellows 16 is mounted at its lower end in the bracket 17 and the upper end engages with the switch actuating arm 18 which is pivotally mounted upon the pin 19. The spring 20 and the adjusting nut 21 are provided for controlling operation of the arm 18 by the temperature responsive element in order to obtain the desired regulation of the refrigerator temperature. The stop 22 serves to prevent too great contraction of the sylphon bellows.

At the right hand end of the arm 18 the tilting mercury switch 14 is carried in a cradle 23, preferably formed of moulded insulating material such as bakelite or the like. The cradle 23 is pivotedly mounted upon the pin 24 extending from the bent up portion 25 at the free end of the operating arm 18.

The electroresponsive overload protective element 12 as shown is of the thermal type. The movable bi-metallic thermal responsive element 26 is fixedly secured at its lower end to the metal plate 27 with the free end of the thermal element hooked over in co-operating latching relation with the projecting shoulder 28 formed on the mercury tube cradle 23. The thermal responsive element 26 is heated by means of the electrical heating coil 29 which is located in proximity to the bi-metallic element 26 and is energized in accordance with the current of the refrigerator operating motor as will be more fully described hereinafter. With the thermal element 26 at normal temperature, the free end thereof is maintained in latching engagement with the shoulder 28 as indicated in Fig. 1 and serves as a fulcrum about which the cradle 23 is tilted when the switch actuating arm 18 is raised by the bellows 16 as indicated by the dotted lines in Fig. 1.

The manual control element 13 preferably is formed of suitable moulded insulating composition with a rearwardly extending portion 30 of rectangular form as indicated by the dotted lines in the drawing and is pivotally mounted near the end of the rearwardly extending portion upon the vertical pin 31. On the front side of element 13 the operating handle or button 32 is provided so that the element 13 may be manually operated either to the right or the left. The control element 13 is so arranged that when the button 32 is moved to the right, the thermal element 26 is engaged by the rearwardly extending portion 30 of control element 13 and the hooked end of the terminal element is moved out of engagement with the shoulder 28. This permits the cradle 23 to rotate freely about the pin 24 in a counterclockwise direction due to the off center weight of the mercury tube 14. Upon operation of the button 32 of the manual control element 13 to the left, the rearwardly extending portion 30 engages with the tapering extension 33 formed on the mercury tube cradle 23. This results in rotation of the cradle in a clockwise direction about the pin 24 to re-engage the hooked end of the terminal element 26 with the shoulder 28.

The mercury tube switch 14 may be of any conventional type. As shown the mercury tube switch is provided with the contact terminals 34 enclosed within the glass tube 35 and arranged to be bridged by the globule of mercury 36 when the tube is raised to or past substantially the horizontal position. The mercury switch may be exhausted or filled with an inert gas as desired. One of the contact terminals of the mercury switch is connected through the flexible connector 37 to the line terminal 38 while the other contact of the mercury switch is connected through the flexible connector 39 to the upturned portion 40 of the metal plate 27, which thus serves as a conductor in the circuit controlled by the mercury switch.

While not in any way essential to the operation of the control mechanism previously described, the refrigerator control apparatus shown in Fig. 1 also includes an electromagnetically operated motor starting switch 41 and a starting resistor 42 such as are commonly provided for starting certain well known types of alternating current motors provided with a starting as well as a running winding.

Figure 3:
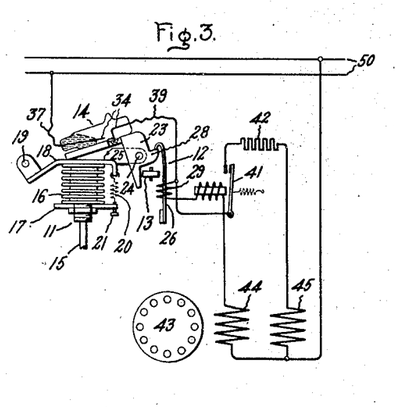
Figs. 3, 4 and 5 show the relative position of the various parts of the controller of Fig. 1 during different phases of operation.
Figure 4:
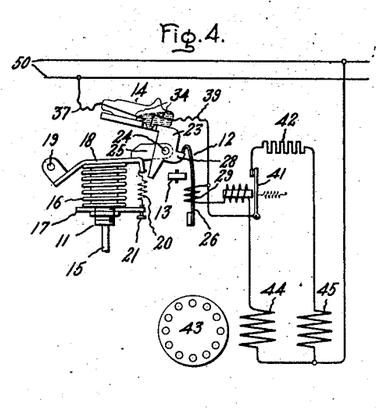
Figure 5:
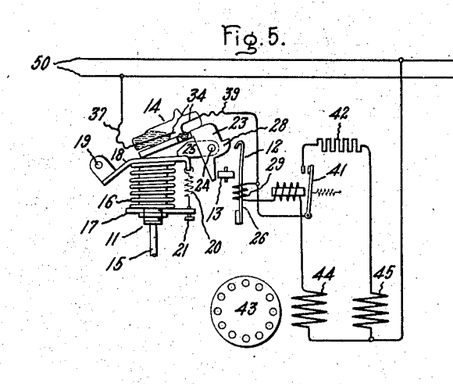

In Figs. 3, 4 and 5, the mercury switch type of control mechanism of Fig. 1 is shown connected to control the circuit of the alternating current induction motor 43 having the running winding 44 and the starting winding 45. These figures illustrate diagrammatically the manner in which the starting switch 41 and the starting resistor 42 are arranged to control the starting winding of the motor.

Figure 2:
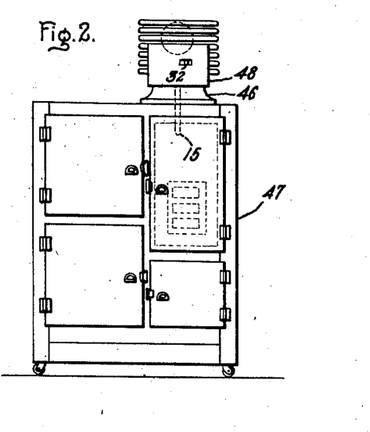
Fig. 2 shows the location of the control equipment on the electric refrigerator.

Fig. 2 illustrates one way in which the refrigerator control switch mechanism shown in detail in Fig. 1 may be mounted upon an electric refrigerator of an improved type which is described and claimed in the copending applications of Clark Orr Serial Number 756,336, filed December 16, 1924, and of Christian Steenstrup Serial Number 109,960, filed May 18, 1926, both assigned to the assignee of the present application. While forming no part of my present invention, briefly the electric refrigerator mechanism comprises an alternating current induction motor preferably of the type illustrated in Figs. 3, 4 and 5 which is connected to drive a suitable compressor pump, the motor and the compressor being enclosed and hermetically sealed within the casing 46. This permits the electric refrigerating apparatus to be mounted as a unit in an opening in the top of the refrigerator 47 which may be of any suitable type. The refrigerator control apparatus of Fig. 1 is shown mounted in an enclosing case 48 supported upon the casing 46. The enclosing case 48 is provided with a suitable opening through which the operating handle 32 of the manually operated on and off control element 13 projects so as conveniently to be operated to the right or to the left to effect the starting and stopping of the electric refrigerator mechanism as desired. As indicated by the dotted lines in Fig. 2, the pipe 15 containing the temperature responsive fluid extends into the refrigerating compartment so as to be subjected to the temperature conditions obtaining therein.

As thus arranged the operation of the control switch mechanism shown in Figs. 1 to 5 in controlling the operation of the refrigerator is as follows: With the several controlling elements of the refrigerator controlling switch mechanism in their respective positions shown in Fig. 1, the refrigerator is in full automatic operating condition. With the sylphon bellows 16 of the temperature control elements in its contracted position as shown, operation of the refrigerating mechanism has lowered the temperature within the refrigerator sufficiently to permit the circuit of the refrigerator driving motor 43 to be interrupted at the contacts of the tilting mercury switch 14 to stop further refrigerating action. As the temperature within the refrigerator necessarily increases due to the leakage of heat through the walls thereof, or from opening the doors or other cause the fluid within the temperature responsive element 11 correspondingly expands and thereby increases the pressure exerted upon the sylphon bellows 16. This results in the bellows elongating and raising the actuating arm 18 as indicated in Fig. 4. As the arm 18 is raised, the cradle 23 carrying the mercury switch 14 pivots about the pin 24 with the hooked end of the thermostatic element 26 as a fulcrum. Thus the mercury switch 14 is tilted from the open position, as is shown in Fig. 3 to the closed position as shown in Fig. 4. This first establishes a circuit for the running winding 44 which may be traced from the lower supply line 50 through the mercury switch 14, the heater coil 29 of the thermostatic overload protective device, the operating winding of the starting switch 41, the running winding 44 of the motor and thence to the upper supply line 50. The inrush of current to the motor immediately closes the starting switch 41 which completes the circuit for the starting winding 45 through the starting resistor 42. When the motor 43 has started the refrigerator compressor pump and has accelerated to substantially full running speed, the current through the operating winding of the starting switch 41 is decreased in value sufficiently to permit the switch 41 to return to the open position in accordance with its bias. This opens the circuit of the starting winding 45 and the running winding 44 continues operation of the motor.

As the motor 43 continues to operate the compressor pump, the refrigerating action serves to lower the temperature within the refrigerating compartment. When the temperature has been lowered the desired amount, the pressure of the fluid within the tube 15 is decreased and the sylphon bellows 16 is again contracted, thereby lowering the actuating arm 18. As a result the cradle 23 is rotated about the pin 24 in the reverse direction to return the mercury switch 14 to the open position as shown in Fig. 3.

Under normal operating conditions the starting and running cycle of the refrigerator motor 43 is controlled in the manner just described entirely automatically by the temperature responsive element 11 so as to maintain the temperature of the refrigerator within the desired limits. By adjustment of the tension of the spring 20 through the agency of the adjusting nut 21, the limits of temperature within the refrigerator required to effect operation of the mercury switch may be varied at will. Decreasing the tension of spring 20 serves to lower the temperature limits while increasing the tension of spring 20 has the reverse effect.

If at any time during operation of the refrigerator under the control of the automatic temperature regulating element the refrigerator motor 43 should become stalled or overloaded due to accidental derangement of the refrigerating mechanism or for any other reason, the stalled or overload current of the motor flowing through the heating winding 29 causes the thermal responsive element 26 to interrupt the motor circuit if the current is continued for any appreciable time interval. The thermal element 26 flexes due to heating and disengages the hooked end thereof from the shoulder 28, thereby releasing the cradle 23 for rotation about the pin 24 to the circuit opening position as indicated in Fig. 5 entirely independently of operation of the refrigerator temperature responsive sylphon bellows 16. In this way the electrically heated thermoresponsive element 26 effectively prevents injurious heating or burning out of the motor windings under any operating condition.

To replace the refrigerator in operation after the circuit of the operating motor has been interrupted automatically due to operation of the electroresponsive overload protective device 12, it is necessary to move the manual control element 13 to the left to rotate the cradle 23 about the pin 24 to re-engage the shoulder 28 with the free end of the thermoresponsive element 26. Assuming the difficulties have been overcome that caused stalling or overloading of the motor and consequently operation of the overload protective device 12, the refrigerator will continue in operation under the automatic control of the temperature responsive sylphon bellows 16 in the manner previously described.

If at any time and for any reason it is desired to stop further operation of the refrigerator independently of the automatic temperature or overload controlling elements, the manual control element 13 is operated to the right. This disengages the hooked end of the thermo element 26 from the shoulder 28 and the mercury switch 14 at once tilts to the circuit opening position as previously described. When it is desired to restart operation of the refrigerator, the manual control element 13 is operated to the left to re-engage the shoulder 28 with the free end of the thermo element 26 in the same manner pointed out above.

Figure 6:
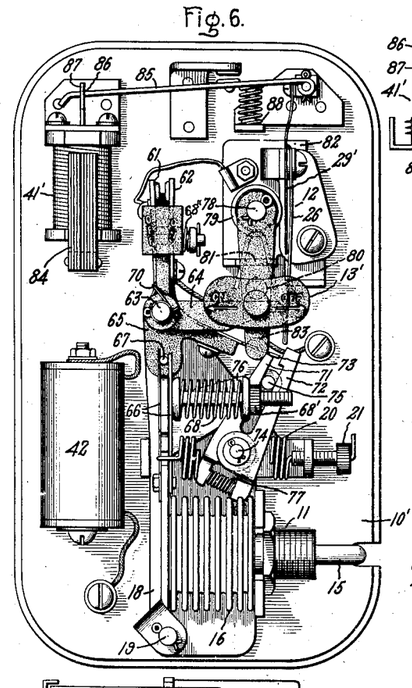
Fig. 6 is an assembly showing an electric refrigerator controlling switch mechanism of the relatively movable contact type embodying the invention and Figs. 7, 8 and 9 illustrate the relative positions of the various control elements during different phases of operation.

In Fig. 6 the invention is shown embodied in a modified form of switch mechanism which provides automatic temperature control and automatic overload protection as well as manual control of the operation of the refrigerator in the same general manner as the tilting mercury switch mechanism previously described. In this form the refrigerating control mechanism is provided with relatively movable circuit controlling contacts of the usual contactor or relay type instead of the tilting mercury switch for controlling the closing and opening of the refrigerator motor circuit.

With the construction shown in Fig. 6, the switch mechanism is mounted upon a base 10 of suitable insulating material and includes a refrigerator temperature responsive element 11 of the sylphon bellows type identical with that previously described. Likewise, the electroresponsive overload protective device 12 is of the same bimetallic thermal type and provided with a heating coil 29' as previously described. The manual control element 13' also co-operates with the automatic control elements 11 and 12 to initiate and terminate operation of the refrigerator as desired.

In this case, the circuit of the refrigerator motor is controlled by the refrigerator temperature responsive element 11 and the overload protective device 12 as well as the manual control element 13' through the agency of the co-operating movable contact elements 61 and 62, which are pivotally mounted upon the pin 63. The contact 61 is carried by the lever arm 65 and the contact 62 is carried by the lever arm 64, each lever arm preferably being formed of moulded insulating material and rotatably mounted, one behind the other, on the pin 63 as indicated in the drawing. Thus each of the lever arms is movable independently of the other arm to bring the contacts 61 and 62 into and out of circuit closing engagement.

The contact 61 is moved into and out of engagement with the contact 62 by the automatic temperature responsive actuating element 11 operating through the actuating arm 18. The actuating arm 18 is pivotally mounted upon the pin 19 and is provided with the two yielding elements 66 which straddle the pin 67 projecting from the side of the contact arm 65. The spring 20 and the adjusting thumb nut 21 are provided for varying the operating limits of the refrigerator temperature responsive element 11. The adjustable compression spring 68 permits the range of the temperature responsive element 11 to be varied by adjusting the pressure exerted upon the right hand yielding element 66 as will be more fully set forth hereinafter.

The contact 62 is yieldingly mounted upon the arm 64 by means of the compression spring 68'' to insure a firm circuit closing engagement thereof with the contact 61. Normally the arm 64 is biased by the spring 70 to rotate in the clockwise direction so as to thereby move the contact 62 out of engagement with the contact 61. However the arm 64 is held in the position in which it is shown in Fig. 6 by the engagement of the hooked end of the bimetallic thermal responsive element 26 with the end of the arm 64 as shown in dotted lines.

For the purpose of insuring a quick make and break operation of the contact 61 by the temperature responsive element 11, a mechanism is provided comprising the co-operating latching arms 71 and 72 and the notched arm 73 secured to and extending diagonally from the contact arm 65. Both of the latching arms 71 and 72 are mounted upon a pivot pin 74 and are actuated by a pin 75 secured to the end of an arm 76 which extends from the switch actuating arm 18, preferably being a bent up portion thereof. The spring 77 inserted between the lower ends of the latching arms 71 and 72 serve to bias each of the arms into engagement with the actuating pin 75. The manner in which the latching arms 71 and 72 function to produce the quick make and break of the contact 61 will be described in detail in connection with the operation of the refrigerator control mechanism.

The manual control element 13' of suitable moulded material is rotatably mounted upon the pin 78 to be moved respectively in the "on" or "off" directions as indicated. A spring 79 encircles the hub of the manual control element 13' with the two ends of the spring disposed on either side of the circular projection 80 extending from the reverse side of the element 13' as indicated by the dotted lines in the drawing. The two ends of the spring 79 also straddle a stop 81 formed by a bent up portion of the metallic support plate 82, upon which the manual operating element 13' as well as overload thermal responsive element 26 is mounted. Thus, the spring 79 serves to bias the manual control element 13' to the mid position shown by the engagement of the projection 80 with one or the other of the ends of the spring when the manual control element is operated to the "on" or to the "off" positions.

When the manual control element 13' is operated to the "off" position another circular projection 83 formed on the reverse side of the lower end of the manual control element engages with the end of the thermal responsive element 26 and thereby moves the hooked end of the thermal element out of engagement with the end of the contact arm 64. This permits the biasing spring 70 to rotate the arm 64 in a clockwise direction about the pivot 63 and thereby carry the contact 62 out of cooperating relation with the contact 61 to insure interruption of the circuit controlled thereby. Downward movement of the end of the arm 64 is arrested by the extension 83 on the reverse side of the manual control element. The arm 64 together with the contact 62 may be returned to the positions in which they are shown in Fig. 6 by movement of the manual control element 13' to the "on" position. In this case, the extension 83 slides along the tapering lower side of the arm 64, thereby raising the arm 64 until the end thereof is re-engaged with the hooked end of the thermal strip 26 and thereby maintains the contact 62 in cooperating relation with the contact 61.

I will be observed that the electroresponsive switch 41' for controlling the starting winding of the refrigerator driving motor is of a somewhat different form than that previously described in Fig. 1. As shown in Fig. 6, the starting winding switch 41' comprises an electromagnet having an E shaped movable armature 84 as more clearly shown in Figs. 7, 8 and 9. The movable armature 84 is connected to the starting switch member 85 through a lost motion connection formed by inserting the end of the switch member 85 through an elongated slot 86 in the extension 87 from the middle leg of the E shaped armature 84. When the operating electro-magnet of the starting switch 41' is deenergized, the armature 84 drops to the position shown in Fig. 6, and thereby operates the switch arm 85 to the open position in which it is shown. When the operating electromagnet of the starting switch 41' is energized, the armature 84 is raised and thereby permits the biasing spring 88 to operate the starting switch 85 to the circuit closing position. As shown diagrammatically in the Figs. 7, 8 and 9, the starting switch 41' controls the circuit of the starting winding 45 of the refrigerator compressor driving motor 43 which as shown is of the alternating current induction type previously described in connection with Figs. 3, 4 and 5.

The operation of the modified form of the refrigerator control mechanism constructed as shown in Fig. 6 in controlling the compressor driving motor will be more fully understood by referring to the circuit diagrams 7, 8 and 9.

Figure 7:
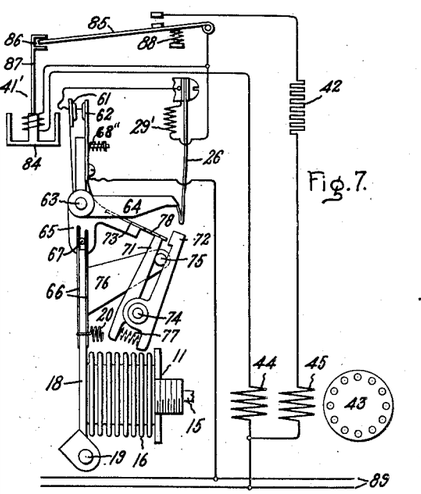

With the parts of the control mechanism in their respective positions shown in Figs. 6 and 7, the contact 61 is disengaged from the contact 62 due to the contraction of the bellows 16 of the refrigerator temperature responsive element 11, thus indicating that the temperature within the refrigerator has been reduced to the desired lower limit. Consequently, the circuit of the motor is interrupted, and the motor is at rest.

When the bellows 16 elongates as the refrigerator temperature increases due to heat leakage and other causes, the bellows 16 moves the switch operating arm 18 to the left, thereby pressing the right hand yielding element 66 against the pin 67 extending from the contact arm 65. Movement of the arm 65, however, is prevented by the latching arm 71 which is in abutting engagement with the end of the arm 73. This results in setting up a strain in the spring 68 as the actuating arm is gradually moved to the left. During this movement, the pin 75 gradually slides the latching arm 71 to the left. When the movement of arm 18 is sufficient to slide the end of the latching arm 71 into the notch 78 formed in the arm 73, the spring 68 thereon is free to effect a rapid clockwise movement of the contact arm 65 and thereby quickly bring the contact 61 into engagement with the contact 62 with a snap action. The relative position of the latching arm 71 in the slot in the cooperating arm 73 to permit the quick engagement of the contacts 61 and 62 is shown more fully in Fig. 8.

Figure 8:
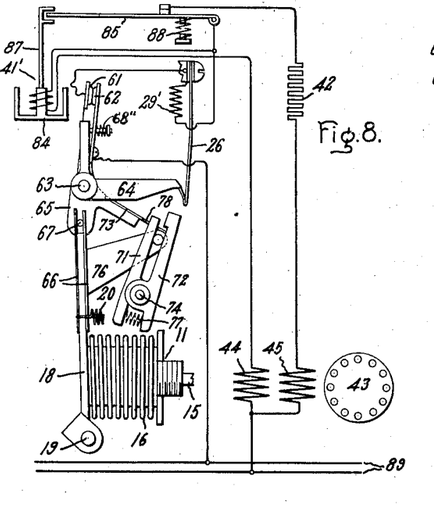

Upon engagement of the contacts 61 and 62 the starting winding 44 of the motor 43 is energized from the supply lines 89 through a circuit extending from the upper supply lines through the contacts 61 and 62, the heater 29', the winding of the starting switch 41' and thence through the winding 44 to the lower supply line. With the motor at standstill, the large inrush of current through the winding of the starting switch 41' at once operates the armature 84 to release the contact arm 85 and thereby permit closure of the starting contacts by the biasing spring 88 as indicated in Fig. 8. Closure of the starting switch energizes the starting winding 45 of the motor through the starting resistor 42 and the motor thereupon starts and accelerates the refrigerator compressor mechanism. When the motor reaches its normal speed, the decreased excitation of the starting switch 41' permits the armature 84 to drop and thereby open the circuit of the motor starting winding 45.

When the motor 43 has operated the compressor mechanism sufficiently to produce the required decrease in temperature within the refrigerator, the bellows 16 of the temperature responsive element contracts, thereby permitting the spring 20 to return the switch actuating arm 18 to the right. This sets up a strain in the yielding element 66, tending to disengage the contact 61 from the contact 62. In this case, however, the shoulder at the end of the latching arm 72 restrains upward movement of the arm 73 on the rotatable switch contact arm 65 until the pin 75 has moved to the right sufficiently to disengage the arm 72 from the end of the arm 73. This releases the contact 61 for a quick break from the contact 62 by the left hand yielding element 66. The quick make and break feature not only preserves the contact 61 and 62 from injurious arcing but also prevents any chattering of the contacts that might result in repeatedly establishing or interrupting the circuit of the motor. Upon disengagement of the contacts 61 and 62, the motor circuit is interrupted preparatory to repeating the cycle of operation of the motor just described under the control of the refrigerator temperature responsive element. Under normal operating conditions the temperature responsive element continues indefinitely to start and stop the motor as required to maintain the refrigerator temperature within the desired limits.

The minimum and maximum limits of temperature at which operation of the refrigerator motor is started and stopped may be adjusted at will. This is accomplished by turning the adjusting nut 21 so as to increase or decrease the tension of the spring 20. Increasing the tension of spring 20 serves to raise both the maximum and the minimum temperature limits, while decreasing the tension of the spring has the opposite effect. In order to vary the range between the temperature limits, the tension of the spring 68 acting upon the right hand yielding element 66 is varied by turning the adjusting nut 68' associated therewith. When the nut 68' is turned to compress the spring 68, the additional strain of the spring 68 is added to the force of the adjusting spring 20 so as to raise the maximum temperature limit at which the control mechanism is operated to start the motor without however altering the minimum temperature limit at which the control switch mechanism is operated to stop the motor. This adjustment of the range as well as of the limits of temperature control permits the operation of the refrigerator motor to be controlled very accurately so as to operate most efficiently and produce the desired refrigerating results. Moreover, the adjustments may be made easily and conveniently at any time, even during operation of the control mechanism.

Figure 9:
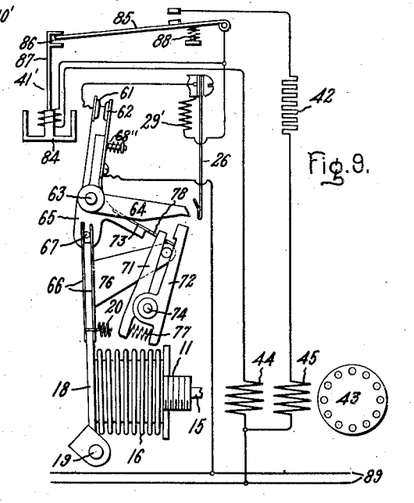

If at any time, the motor fails to start properly or becomes overloaded for any reason, the resulting current flow through the heater 29 causes flexure of the thermal responsive element 26 to the right after the lapse of a certain time interval. The flexure of the thermal element moves the hooked over end thereof out of engagement with the contact arm 64, thereby permitting the spring 70 to move the contact 62 out of co-operating relation with the contact 61, as shown in Fig. 9 thereby interrupting the motor circuit. The manner of resetting of the contact arm 64 by operation of the manual controlled element 13' to the left has been previously described.

Likewise, the operation of the manual control element 13' to the right to disengage the thermal element from the end of the arm 64 irrespective of the heating effect of the motor current to terminate at will operation of the refrigerator also previously has been set forth.

From the foregoing, it will be seen that my invention makes it possible to consolidate the controlling functions of a plurality of automatically operated devices and the manually operated device all in a single circuit controlling switch mechanism so that each device is able to effect the opening of the circuit independently of the other devices and at least two of the devices also can effect the reclosure of the circuit as it is opened thereby. In this way, the invention presents a compact and reliable circuit controller that is of particular advantage in controlling electric refrigerators or in other similar service. While I have illustrated and described two forms of switch mechanism embodying the invention, it will be understood that the invention also may be embodied in other forms.

What I claim as new and desire to secure by Letters Patent of the United States, is:

1. In a circuit controlling device, the combination of movable means for controlling the circuit, at least three separate operating means therefor, and connections between each operating means and the movable circuit controlling means for effecting movement of the circuit controlling means from one circuit controlling position to another circuit controlling position, the connections of at least a plurality of said operating means being arranged to permit the said operating means to effect return movement of the circuit controlling means from said other circuit controlling position to said one circuit controlling position.

2. In a circuit controlling device, the combination of means operable to control the circuit, at least three separate operating means therefor, and mechanical connections between said operating means and said circuit controlling means permitting each operating means to operate the circuit controlling means from one circuit controlling position to another circuit controlling position independently of operation of the other means and permitting each of a plurality of said operating means to return the circuit controlling means to said one circuit controlling position.

3. In a circuit controlling device, the combination of means operable to control the circuit, separate manually controlled and automatically controlled means for operating said circuit controlling means, and mechanical connections between said operating means and said circuit controlling means permitting each of said operating means to effect the opening of the controlled circuit independently of operation of the other operating means and permitting a plurality of said operating means to effect the closing of the controlled circuit after operation thereof to open the circuit.

4. In a circuit controlling device, the combination of means operable to control the circuit, manually controlled means for operating said first means to open and close the circuit, a plurality of automatically controlled means each arranged to effect operation of the circuit controlling means to open the circuit in accordance with a different predetermined condition, and at least one of said automatic operating means being arranged to effect the reclosing of the circuit in accordance with the corresponding condition after the opening of the circuit by said automatic operating means.

5. In a circuit controlling device, the combination of means operable to control the closing and opening of the circuit, a plurality of operating means mechanically connected to control the operation of said circuit controlling means, one of said means being operable responsively to predetermined conditions to effect the closing and opening of the circuit automatically in accordance with said conditions when the remaining operating means are inactive, a second one of said means being responsive to a different predetermined condition to insure the opening of the circuit in accordance therewith independently of the operation of said first means, and a third one of said means being manually operable to effect the opening and closing of said circuit at will.

6. In a circuit controlling device, the combination of a switch mechanism having relatively movable circuit controlling contacts, a plurality of automatic means each responsive to a different predetermined condition and mechanically connected to effect relative movement of said contacts in accordance therewith, and manually operable means mechanically connected to effect relative movement of the contacts independently of said conditions.

7. In a circuit controlling device, the combination of movable means for controlling the circuit, temperature responsive means for automatically effecting circuit closing and circuit opening movement of said means in accordance with predetermined temperature conditions, manually operable means for effecting circuit closing and circuit opening movement of said means at will, and electroresponsive means for effecting circuit opening movement of said means in accordance with predetermined current conditions.

8. In a circuit controlling device, the combination with cooperating circuit controlling members operable into circuit closing engagement, of controlling means therefor including a temperature responsive device for effecting disengagement of said members in response to a predetermined temperature condition, an electroresponsive device for effecting disengagement of the members in response to predetermined electrical conditions, and a manually operated device for effecting disengagement of the members, and mechanical connections between the circuit controlling members and the said controlling means permitting operation of the members by each controlling device independently of the operation of the other controlling devices.

9. In a circuit controlling device for an electric refrigerator, the combination of movable means for controlling the circuit of the refrigerator, mechanism responsive to the temperature of the refrigerator for effecting circuit closing and circuit opening movement of said means at adjustable maximum and minimum temperature limits, automatic electroresponsive means connected to be energized in accordance with the current in the refrigerator circuit for effecting circuit opening movement of said movable circuit controlling means upon the occurrence of overload conditions in the circuit and manual means for operating said movable circuit controlling means to initiate and terminate automatic operation of the refrigerator at will.

10. A circuit controlling device comprising a pair of cooperating movable circuit controlling contacts, a plurality of automatic means, each responsive to a different predetermined condition and each associated with a different one of said contacts for effecting circuit controlling movement thereof relatively to the other contact in accordance with said conditions, and a manual operating means for effecting circuit controlling movement of one of said contacts at will independently of the automatic means associated therewith.

11. A circuit controlling device comprising two independently operable contact members, each having an automatic operating means available, said means being responsive to different predetermined conditions and each mechanically connected to operate the corresponding one of said contacts relatively to the other contact in response to said predetermined condition, and a manual operating means mechanically connected to operate one of the contacts at will independently of the response of the automatic operating means associated therewith.

12. A circuit controlling device comprising a pair of cooperating movable circuit controlling contact members, means responsive to predetermined conditions associated with one of said contact members for automatically operating the same into and out of circuit closing engagement with the other contact in accordance with said condition, means responsive to different predetermined conditions for operating the other contact out of circuit controlling relations with said one contact in accordance with said different conditions and manual control means for operating the said other contact into and out of circuit controlling the relation with said one contact at will.

13. In a circuit controlling device, the combination of a pair of cooperating movable circuit controlling contact members, temperature responsive means for automatically effecting circuit closing and circuit opening movements of one of said contact members, electroresponsive means for automatically effecting circuit opening movement of the other contact member and manually operable means for effecting both circuit opening and circuit closing movements of said other contact at will.

14. In a circuit controlling device having a pair of cooperating movable circuit controlling contact members, the combination of automatic means mechanically connected to operate one of said contact members to and from the circuit closing position with a snap action in accordance with predetermined conditions, manual means for operating the other contact member to and from the circuit closing position at will, and the electroresponsive means for maintaining said other contact in the circuit closing position under certain conditions.

15. In a circuit controlling device for an electric refrigerator, the combination of movable means for controlling the circuit of the refrigerator means responsive to the temperature of the refrigerator for automatically effecting circuit closing and circuit opening movement of said means at certain minimum and maximum temperature limits, means for ensuring a snap action in both the circuit closing and circuit opening movements of said circuit controlling means, adjustable means associated with the temperature responsive means for varying the said minimum and maximum temperature limits and independently adjustable means associated with the temperature responsive means for varying the range between said minimum and maximum limits.

16. In a circuit controlling device for an electric refrigerator the combination of relatively movable contact members for controlling the circuit of the refrigerator, a sylphon bellows temperature responsive device arranged to operate in accordance with the temperature of the refrigerator for automatically effecting circuit closing and circuit opening movements of said contact members, at certain minimum and maximum limits, latch mechanism associated with the relatively movable contact members for ensuring a snap action in both the circuit closing and circuit opening movements thereof, an adjustable spring acting in opposition to the sylphon bellows for varying said maximum and minimum temperature limits, and an independently adjustable spring associated with the sylphon bellows for varying the range between said minimum and maximum limits.

17. A controlling device for an electric refrigerator comprising a pair of cooperating independently movable circuit controlling members for establishing and interrupting the circuit of the refrigerator, a device movable responsively to variations in the refrigerator temperature and yieldingly connected to operate one of said members to and from the circuit closing position in accordance with said variations, mechanism for restraining said member until after a limited movement of said device to ensure a quick movement of said one member to and from said circuit closing position, electroresponsive means connected to be energized in accordance with the current in the refrigerator circuit and normally arranged to maintain the other of said circuit controlling members in circuit controlling relation with said one member until the occurrence of abnormal conditions in the refrigerator circuit and a manually controlling member for operating at will said other circuit controlling member into and out of circuit controlling relation with the said one member.

18. A controlling device for an electric refrigerator comprising a pair of cooperating circuit controlling members for establishing and interrupting the circuit of the refrigerator, one of said members biased out of circuit controlling relation with the other, a latch of thermal-responsive material for holding the said one member in circuit controlling relation with the other member, a device movable responsively to variations in the refrigerator temperature and connected to operate the other member into and out of circuit closing engagement with said one member in accordance with said variations, means for heating said latch on the occurrence of an abnormal current flow in the refrigerator circuit to effect the release of the circuit controlling member controlled by the said latch and therefore open the circuit of the refrigerator, and a manual control member for flexing the latch to release said member and for returning the member into latching relation therewith at will.

In witness whereof, I have hereunto set my hand this 9th day of December, 1926.

LEONARD P. HUTT.